US012544758B2

(12) United States Patent
Knapp et al.

(10) Patent No.: US 12,544,758 B2
(45) Date of Patent: Feb. 10, 2026

(54) MICROFLUIDIC DEVICE FOR PROCESSING AND ALIQUOTING A SAMPLE LIQUID, METHOD AND CONTROLLER FOR OPERATING A MICROFLUIDIC DEVICE, AND MICROFLUIDIC SYSTEM FOR CARRYING OUT AN ANALYSIS OF A SAMPLE LIQUID

(71) Applicant: Robert Bosch GmbH, Stuttgart (DE)

(72) Inventors: Michael Knapp, Wiernsheim (DE); Franz Laermer, Weil Der Stadt (DE); Jochen Hoffmann, Renningen (DE); Lorenz Boecking, Stuttgart (DE); Hannah Bott, Straubenhardt (DE); Daniel Sebastian Podbiel, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 1051 days.

(21) Appl. No.: 17/597,190

(22) PCT Filed: Jun. 30, 2020

(86) PCT No.: PCT/EP2020/068373
§ 371 (c)(1),
(2) Date: Dec. 28, 2021

(87) PCT Pub. No.: WO2021/001355
PCT Pub. Date: Jan. 7, 2021

(65) Prior Publication Data

US 2022/0305493 A1 Sep. 29, 2022

(30) Foreign Application Priority Data

Jul. 3, 2019 (DE) ..................... 10 2019 209 746.4

(51) Int. Cl.
*B01L 3/00* (2006.01)

(52) U.S. Cl.
CPC ... *B01L 3/502769* (2013.01); *B01L 3/502761* (2013.01); *B01L 2300/0864* (2013.01);
(Continued)

(58) Field of Classification Search
None
See application file for complete search history.

(56) References Cited

U.S. PATENT DOCUMENTS

2007/0275415 A1 11/2007 Srinivasan et al.
2010/0129896 A1* 5/2010 Knapp ................ C12Q 1/6837 435/285.1

(Continued)

FOREIGN PATENT DOCUMENTS

CN 102187216 A 9/2011

OTHER PUBLICATIONS

International Search Report corresponding to PCT Application No. PCT/EP2020/068373, mailed Sep. 24, 2020 (German and English language document) (6 pages).

*Primary Examiner* — Lore R Jarrett
(74) *Attorney, Agent, or Firm* — Maginot, Moore & Beck LLP

(57) ABSTRACT

A microfluidic device is for processing and aliquoting a sample liquid. The microfluidic device has a dividing chamber for receiving a starting volume of the sample liquid. The dividing chamber has a plurality of cavities for receiving sub-volumes of the sample liquid, the sub-volumes being usable for analytical reactions. The microfluidic device also has a microfluidic network for using the dividing chamber in a fluid-mechanical manner and at least one pump device for pumping fluids within the device. The at least one pump device and the microfluidic network are configured to pump the sample liquid, as a first phase, and a sealing liquid, as a second phase, through the microfluidic network and into the
(Continued)

dividing chamber in order to seal the sub-volumes of the sample liquid in the cavities using the sealing liquid.

14 Claims, 9 Drawing Sheets

(52) U.S. Cl.
CPC ..... *B01L 2300/123* (2013.01); *B01L 2300/18* (2013.01); *B01L 2400/0487* (2013.01); *B01L 2400/0622* (2013.01)

(56) References Cited

U.S. PATENT DOCUMENTS

| | | | |
|---|---|---|---|
| 2012/0039774 A1 | 2/2012 | Yotoriyama et al. | |
| 2015/0204785 A1 | 7/2015 | Kim et al. | |
| 2016/0096172 A1 | 4/2016 | Chiu et al. | |
| 2016/0354777 A1 | 12/2016 | Chiu et al. | |
| 2018/0169657 A1 * | 6/2018 | Kelly | C12M 23/58 |
| 2018/0299380 A1 | 10/2018 | Makino et al. | |

* cited by examiner

MICROFLUIDIC DEVICE FOR PROCESSING AND ALIQUOTING A SAMPLE LIQUID, METHOD AND CONTROLLER FOR OPERATING A MICROFLUIDIC DEVICE, AND MICROFLUIDIC SYSTEM FOR CARRYING OUT AN ANALYSIS OF A SAMPLE LIQUID

This application is a 35 U.S.C. § 371 National Stage Application of PCT/EP2020/068373, filed on Jun. 30, 2020, which claims the benefit of priority to Serial No. DE 10 2019 209 746.4, filed on Jul. 3, 2019 in Germany, the disclosures of which are incorporated herein by reference in their entirety.

BACKGROUND

The disclosure proceeds from an apparatus or a method as described herein.

Microfluidic analysis systems, so-called labs-on-a-chip or LoCs for short, permit in particular automated, reliable, rapid, compact and cost-effective processing of patient samples for medical diagnosis. Through a combination of a multiplicity of operations for controlled manipulation of fluids, it is possible to carry out complex molecular diagnostic test procedures on a lab-on-a-chip cartridge. In this case, the aliquoting of a liquid volume constitutes an important operation which forms the basis for highly parallelized sample processing and for molecular diagnostic sample analyses with a high degree of multiplexing. By way of example, polymerase chain reactions which are independent of one another can be carried out in individual aliquots of the liquid, said reactions permitting an amplification of specific deoxyribonucleic acid base sequences and thus a highly sensitive, molecular diagnostic detection.

Already established techniques for aliquoting a sample liquid in a microfluidic apparatus can for example have, in addition to the insertion of a sample into the apparatus, further steps which are to be carried out manually and which are not readily amenable to automation, and/or can possibly in particular offer no microfluidic environment or connection to a microfluidic environment which would permit automated pre-processing of the sample prior to the aliquoting, for example sample preparation for the extraction of deoxyribonucleic acids from the sample, within the microfluidic apparatus. Existing techniques for aliquoting a sample liquid within a microfluidic environment can be based, for example, on evacuation of the cavities or compartments or centrifugation of the apparatus, in which the centrifugal force is oriented along an inflow opening of the compartments. In the case of such centrifugally driven aliquoting, however, an achievable density of compartments within the plane of rotation can be relatively low owing to the fluid channels required therefor within the plane of rotation, which are necessary for the filling of the compartments.

An apparatus and a method which permit automated aliquoting of a liquid in a lab-on-a-chip cartridge using an aliquoting structure, for example an array of cavities, would therefore be desirable, it in particular additionally being possible to carry out automated processing of the sample prior to the aliquoting within the microfluidic apparatus. In addition, it would be desirable for the apparatus and the method to allow a high transfer efficiency of the sample liquid from the microfluidic network into the cavities of the aliquoting structure, in order to be able to achieve as loss-free processing of the sample liquid as possible. A microfluidic apparatus and a method which require neither an evacuation of the compartments nor such a centrifugation for automated aliquoting of a sample liquid would also be desirable.

SUMMARY

Against this background, the approach presented here presents an apparatus, a method, and furthermore a control unit which uses this method and a system as claimed in the main claims. Advantageous refinements of and improvements to the apparatus specified in the independent claim are possible by the measures stated in the dependent claims.

According to embodiments, it is in particular possible to provide a microfluidic apparatus and a method which permit automated aliquoting of a liquid, in particular a sample liquid, in an aliquoting structure, in particular in a cavity array structure. According to embodiments, it is for example possible to provide an apparatus comprising an aliquoting structure, which is connected to a microfluidic network, and a method in which, in addition to automated aliquoting of the liquid, automated processing of the liquid to be aliquoted can also be carried out prior to the aliquoting in the microfluidic network. In particular, it is also possible according to embodiments for a suitable microfluidic connection of the cavity array structure to a microfluidic network to be provided, said microfluidic connection being able to permit capillary stabilization, and stabilization which is additionally or alternatively brought about by differences in density of the liquids used, of phase boundary interfaces when liquids are being transferred into the chamber comprising the aliquoting structure, in order to thus in particular obtain reliable filling and sealing of all the cavities and a high transfer efficiency.

Advantageously, in addition to the processing of a small volume of a sample liquid as first phase in a microfluidic network and transporting of the sample liquid to the aliquoting structure, it is thus possible according to embodiments for the aliquoting structure to first be brought into contact with the sample liquid and then with a sealing liquid as second phase. In this way, it is in particular possible to prevent another liquid from coming into contact with the aliquoting structure before the sample liquid. This is advantageous because the need for a further liquid, in particular transport liquid, to be displaced from the cavities or compartments of the aliquoting structure by the sample liquid can thus be avoided. In addition, by initially introducing the sample liquid into the cavities or compartments of the aliquoting structure and using the sealing liquid to seal the cavities or compartments filled with the sample liquid as directly as possible, it is possible to allow reagents, in particular dried-on substances which dissolve in the sample liquid, to be pre-stored in the cavities or compartments of the aliquoting structure without the reagents being able to first come into contact with a liquid phase other than the sample liquid. According to embodiments, it is thus for example possible, directly after a cavity or a compartment has been filled with the sample liquid as first phase, for the filled cavity to be promptly sealed using the sealing liquid as second phase. By sealing a cavity filled with sample liquid as rapidly as possible, carryover of substances which are present in a cavity into other, in particular adjacent, cavities of the aliquoting structure can be minimized.

Slow, quasi-static filling of the division chamber comprising the aliquoting structure makes it possible to, where appropriate, utilize the capillary forces occurring at the cavities or compartments of the aliquoting structure to align the microfluidic boundary interface or boundary interfaces at the cavities or compartments in a suitable manner during the propagation through the division chamber. The presence of a stable multi-phase system with controlled propagation within the division chamber comprising the aliquoting structure makes it possible to aliquot the sample liquid even if only a small quantity of sample liquid is present. Conversely, a small quantity of sample liquid may already be sufficient to fill the cavities or compartments of the aliquoting structure with the sample liquid. A high transfer efficiency can thus be achieved. A high transfer efficiency can in turn permit a high sensitivity of, for example, molecular diagnostic analyses of the sample liquid.

What is presented is a microfluidic apparatus for processing and aliquoting a sample liquid, wherein the microfluidic apparatus has the following features:

a division chamber for accommodating an input volume of the sample liquid, wherein the division chamber has a plurality of cavities for accommodating partial volumes of the sample liquid that are usable for detection reactions;

a microfluidic network for making the division chamber accessible in fluid-mechanical fashion, wherein the microfluidic network has at least one feed channel and a removal channel which is connected to the division chamber in fluid-mechanical fashion; and at least one pump device for conveying fluids within the apparatus, wherein the at least one pump device and the microfluidic network are designed to convey the sample liquid as a first phase through the microfluidic network into the division chamber, in order to arrange partial volumes of the sample liquid in the cavities, and to convey a sealing liquid as a second phase through the microfluidic network into the division chamber, in order to seal the partial volumes of the sample liquid in the cavities using the sealing liquid.

The microfluidic apparatus can be at least a part of a microfluidic lab-on-a-chip or chip laboratory for medical diagnosis, microbiological diagnosis, or environmental analysis. The term sample liquid can refer to a liquid to be analyzed, typically a liquid or liquified patient sample, for example blood, urine, stool, sputum, CSF, lavage, a rinsed-out smear or a liquified tissue sample, or a sample of a non-human material. The input volume of the sample liquid can correspond to a volume of the sample liquid introduced into the division chamber. In the cavities, the partial volumes of the sample liquid can be aggregated or isolated. Aliquoting can be understood to mean subdividing large liquid volumes into small ones and enclosing them in individual reaction chambers or cavities. In this case, the sample liquid can be divided into partial volume segments, partial volumes, or cavities of the same or different sizes. The plurality of cavities can represent an aliquoting structure. The two phases can be immiscible or only slightly miscible with one another.

Furthermore, at least one channel branching point of the feed channel into a discharge channel and a supply channel which is connected to the division chamber in fluid-mechanical fashion, and additionally or alternatively at least one valve for influencing a fluid flow in the region of the channel branching point, can be provided. Such an embodiment affords the advantage that fluid can be routed in a non-complex and reliable manner, and in particular when a transport liquid is being used, the latter can be discharged in a simple and precise manner.

The microfluidic apparatus can also comprise the sample liquid and the sealing liquid. In this case, the apparatus can be formed so as to pre-store the sample liquid and the sealing liquid outside of the division chamber. To this end, the apparatus can comprise at least one chamber for pre-storing or keeping available the sample liquid and the sealing liquid.

According to one embodiment, the apparatus can also comprise a temperature-control device for controlling the temperature of the partial volumes of the sample liquid that are arranged in the cavities. Additionally or alternatively, the apparatus can comprise a detection device for optically detecting at least one property of the partial volumes of the sample liquid that are arranged in the cavities. Such an embodiment affords the advantage that it is possible to permit integrated processing, and additionally or alternatively reliable evaluation, for the analysis of the sample liquid in the cavities.

The supply channel can also be branched into at least two sub-channels which lead into the division chamber. Here, it is additionally or alternatively possible for at least one dimension of a fluid channel cross section to be reduced at a region in which the sub-channels lead into the division chamber. Branching of the supply channel to the division chamber or chamber comprising the aliquoting structure makes it possible to obtain a spatially particularly homogeneous flow profile in the division chamber. A spatially homogeneous flow can, in combination with a suitable form of the division chamber, achieve complete wetting of the aliquoting structure, in the case of which each region of the aliquoting structure can initially be brought into contact with the sample liquid and then with the sealing liquid, such that a desired microfluidic functionality can be achieved. Equally, spatially homogeneous wetting of the chamber makes it possible to obtain a particularly high efficiency during the transfer of sample liquid from the microfluidic network into the compartments of the aliquoting structure, since a small quantity of sample liquid is then already sufficient for wetting all of the regions of the aliquoting structure.

As a result of the use of a branching structure composed of microfluidic channels with small cross-sectional area, it is also possible to achieve capillary stabilization of the boundary interfaces of the multi-phase system during the widening of the microfluidic flow prior to the introduction into the division chamber. This can assist in the boundary interfaces of the multi-phase system being introduced into the division chamber in as spatially homogeneous a manner as possible over the total width of the aliquoting structure. A reduction in the spatial dimensions of the fluid-conducting structures at the transition to the division chamber, in particular directly upstream of the aliquoting structure, for example at the transition of the channels of the branching structure to the division chamber, and an associated change in the capillary pressure, as well as a pinning effect that may occur here, makes it possible to obtain suitable alignment of two-phase boundary interfaces, in particular the two-phase boundary interface between air and the sample liquid, before they pass through the aliquoting structure.

Furthermore, the cavities can be formed in a chip which is arranged in the division chamber. Here, at least one dimension of a fluid-conducting region of the division chamber can be reduced in a transition region to the chip in the division chamber. In this way, an alignment, assisted by capillary action, of a liquid meniscus along the total width of the chip can be promoted, before the liquid wets a top side of the chip comprising the cavities. A spatially homogeneous change in capillary pressure and fluidic resistance along the total width of the chip also assists in the formation of a homogeneous flow profile in the division chamber.

The apparatus can also comprise at least one elastic membrane which can be deflected into at least one pump chamber in order to perform the function of the at least one pump device, and which can additionally or alternatively be deflected into at least one valve chamber in order to perform the function of the at least one valve. Such an embodiment affords the advantage that a fluid flow can be controlled in a simple and reliable manner.

According to one embodiment, the apparatus can comprise a plurality of pump devices. Here, the pump devices can be designed to convey fluid in the microfluidic network at different flow rates. Additionally or alternatively, the pump devices can be designed to convey different fluid volumes per pump cycle. Additionally or alternatively, the pump devices can function as a peristaltic pump unit. Such an embodiment affords the advantage that a defined flow rate can be set in an exact manner.

The use of a peristaltic pump device, in particular, makes it possible to produce a low, predefined flow rate for filling the cavities or compartments in the aliquoting structure. This makes it possible to avoid the occurrence of undesired dynamic effects, such as for example the inclusion of air bubbles in the cavities, which are caused for example by inertia forces. A combination of a plurality of pump devices having different pump volumes, and additionally or alternatively a variation in the pump frequency, makes it possible to generate different flow rates in the apparatus. By using a low flow rate for example, in particular when the cavities of the aliquoting structure are being filled with the sample liquid, it is possible to avoid dynamic effects which could have an adverse effect on the filling of the cavities of the aliquoting structure. The use of a relatively high flow rate, in particular when the sealing liquid is being used to seal the cavities of the aliquoting structure, makes it possible to seal the compartments as rapidly as possible in order to, for example, keep undesired exchange of material between adjacent cavities as low as possible. Furthermore, the use of a peristaltic pump device having low pump volumes makes it possible to achieve particularly stable and defined transport of the multi-phase system through the microfluidic network. The stability of the multi-phase system when passing through the pump device can in this case be produced in particular by a small cross-sectional area of the peristaltic pump chambers and the dominating capillary forces. The low pump volume of the peristaltic pump device also precisely defines the absolutely transported liquid volume. Here, the transport can be effected at an integer multiple of the product of pump volume and pump efficiency.

The apparatus can also comprise a further chamber which is connected in parallel to the at least one feed channel in fluid-mechanical fashion and which is connected to a ventilation channel in fluid-mechanical fashion, and a further temperature-control device for controlling the temperature of fluid arranged in the further chamber. Such an embodiment affords the advantage that liquids, here the sealing liquid and optionally additionally the sample liquid, can be degassed in a simple and reliable manner, in order to increase the accuracy of the analysis.

What is also presented is a method for operating an embodiment of the aforementioned microfluidic apparatus, wherein the method has the following steps:

introducing the sample liquid into the apparatus; and effecting conveyance of the sample liquid as first phase, and the sealing liquid as second phase, through the microfluidic network into the division chamber in order to arrange partial volumes of the sample liquid in the cavities and to seal them therein using the sealing liquid.

This method can be implemented for example in software or hardware form, or in a mixture of software and hardware form, for example in a control unit. Between the introduction step and the effecting step, the method may have a step of putting the apparatus into a microfluidic system or a processing unit for controlling a microfluidic flow within the apparatus.

According to one embodiment, the step of effecting conveyance has a sub-step of producing a multi-phase system from the sample liquid as first phase and from at least one further phase, which comprises the sealing liquid and additionally or alternatively a transport liquid, in the microfluidic network. Furthermore, the step of effecting conveyance may have a sub-step of transporting the multi-phase system via the feed channel to the channel branching point by means of the at least one pump device. Here, the at least one valve can be controlled such that a transport liquid which is optionally present in the multi-phase system is discharged via the discharge channel. The step of effecting conveyance may also have a sub-step of introducing the sample liquid, followed by the sealing liquid, via the supply channel into the division chamber. Here, in the introduction sub-step, the at least one valve can be switched over after a boundary interface between the sample liquid and the optionally present transport liquid has passed the channel branching point. Such an embodiment affords the advantage that exact and reliable aliquoting can be performed with low losses or without any losses.

Here, the channel branching point which is located upstream of the aliquoting structure and which has microfluidic valves for controlling the flow can have the effect that the sample liquid is initially embedded in direct contact with the sealing liquid and optionally additionally a transport liquid as second phase, the roles of transport liquid and sealing liquid possibly being able to be realized by the same liquid. This makes it possible to allow the sample liquid to initially be transported without any dead volume to the aliquoting structure in the microfluidic system. Subsequently, by changing a position of the valves arranged upstream of the division chamber, first the sample liquid and then a further liquid, in particular the sealing liquid, which is used to seal the cavities filled with the sample liquid, can be introduced into the division chamber. It is thus in particular possible to prevent transport liquid from undesirably entering and filling the cavities of the aliquoting structure before the sample liquid reaches the cavities. Due to the use of a transport liquid as third phase for transporting the sample liquid as first phase to the aliquoting structure, the sample liquid can be transported without any dead volume. In this way, small volumes of sample liquid can also be processed in the microfluidic network and the aliquoting structure. Furthermore, the avoidance of dead volume makes it possible to obtain increased efficiency of the transfer of sample liquid from the microfluidic network into the cavities of the aliquoting structure. In addition, due to the use of a transport liquid and the fact that the sample liquid as first phase, for example a master mix for a polymerase chain reaction containing purified sample material, and the sealing liquid as second phase, for example a fluorinated hydrocarbon, are embedded into the transport liquid as third phase, for example silicone oil or a mineral oil, it is possible to reduce the required quantity of sealing liquid since this can also be transported without any dead volume to the aliquoting structure or the cavities in the division chamber.

The method can also have a step of controlling the temperature of the partial volumes of the sample liquid that are arranged in the cavities. It is optionally additionally possible for the temperature-control step to be repeated cyclically. Such an embodiment affords the advantage that simple processing of the sample liquid, in particular also so-called thermocycling, can be realized.

Furthermore, the method can also have a step of optically detecting at least one property of the partial volumes of the sample liquid that are arranged in the cavities. The at least one property of the sample liquid may be detectable by means of optical fluorescence. Such an embodiment affords the advantage that the aliquoted sample liquid can be analyzed in an exact and simple manner.

The method can also have a step of thermally degassing the sample liquid and additionally or alternatively the sealing liquid in a further chamber which is connected in parallel to the at least one feed channel in fluid-mechanical fashion and which is connected to a ventilation channel in fluid-mechanical fashion. Such an embodiment affords the advantage that the sample liquid can be analyzed with increased accuracy since there are no longer any disruptive gas bubbles during thermal processing of the sample liquid.

In this case, the method can also have a step in which the sealing liquid which seals the partial volumes of the sample liquid that are arranged in the cavities is displaced by sealing liquid that has been thermally degassed in the thermal degassing step. Such an embodiment affords the advantage that the sample liquid can be analyzed in a particularly reliable and exact manner since the development of gas bubbles can be avoided during thermal processing of the sealed partial volumes of the sample liquid.

Furthermore, a suitable alignment of the apparatus with respect to a gravitational field and the use of a sealing liquid having a suitably low viscosity allows gas bubbles that form to be discharged by means of the buoyancy force that arises. Such gas bubbles may form for example during the temperature control of a liquid to be processed, due to a decrease in the gas solubility in the liquid as the temperature rises. Efficient discharging of gas bubbles makes it possible in particular to prevent sample liquid from vaporizing out of the cavities into gas bubbles adjoining the cavities and being lost as a result. In addition, it is possible to prevent gas bubbles from having an effect on an optical measurement on the sample liquid enclosed in the cavities, for example by optical refraction of the light at the gas-liquid boundary interface.

Suitable alignment of the apparatus with respect to a gravitational field and suitable selection of the sealing liquid, in particular the use of a sealing liquid having a density greater than the density of the sample liquid, also makes it possible to use the gravitational force acting on the two liquids to obtain a spatially homogeneous propagation of the two-phase boundary interface through the division chamber on account of the existing difference in density between the liquids. This is particularly advantageous if at least one spatial dimension of the division chamber exceeds the size scale up to which capillary forces dominate.

The approach presented here also provides a control unit which is designed to carry out, control or implement the steps of a variant of a method described here in corresponding devices. The object on which the disclosure is based can also be achieved in a rapid and efficient manner by this embodiment variant of the disclosure in the form of a control unit.

For this purpose, the control unit can comprise at least one computing unit for processing signals or data, at least one memory unit for storing signals or data, at least one interface to a sensor or an actuator for the purpose of reading in sensor signals from the sensor or for the purpose of outputting control signals to the actuator, and/or at least one communication interface for the purpose of reading in or outputting data which are embedded into a communication protocol. The computing unit may for example be a signal processor, a microcontroller, or the like, wherein the memory unit may be a flash memory, an EEPROM or a magnetic memory unit. The communication interface may be designed to read in or output data in wireless and/or wired fashion, wherein a communication interface that can read in or output wired data can for example electrically or optically read in said data from a corresponding data transmission line or output said data into a corresponding data transmission line.

In the present case, a control unit can be understood to mean an electrical device that processes sensor signals and, in dependence thereon, outputs control and/or data signals. The control unit can comprise an interface which may be embodied in the form of hardware and/or software. In the case of an embodiment in the form of hardware, the interfaces can for example be part of a so-called system ASIC, which contains a wide variety of functions of the control unit. It is however also possible for the interfaces to be separate, integrated circuits or to be at least partially composed of discrete structural elements. In the case of an embodiment in the form of software, the interfaces can be software modules which are for example provided next to other software modules on a microcontroller.

Furthermore, a microfluidic system for carrying out an analysis of a sample liquid is presented, wherein the system has the following features:

an embodiment of the aforementioned microfluidic apparatus; and an embodiment of the aforementioned control unit, wherein the microfluidic apparatus is operably connected to the control unit.

The control unit can be part of a processing unit for controlling the microfluidic flow within the apparatus. The microfluidic apparatus may be mechanically, fluidically, pneumatically, optically and/or magnetically connected to the control unit. The microfluidic system can be a so-called lab-on-a-chip system. The apparatus can be embodied for example as a cartridge for the system.

In an advantageous configuration, the control unit controls a microfluidic flow within the apparatus. The control is effected by means of pneumatic, hydraulic, mechanical, electrical and additionally or alternatively magnetic actuators, such as pumps, valves, elastic membranes, magnets and the like, via suitable interfaces.

Also advantageous is a computer program product or computer program with program code which may be stored on a machine-readable carrier or storage medium such as a semiconductor memory, a hard drive memory or an optical memory and which is used for carrying out, implementing and/or controlling the steps of the method according to one of the embodiments described above in particular when the program product or program is executed on a computer or an apparatus.

It is thus possible according to embodiments to provide in particular a microfluidic apparatus and a method which permit automated aliquoting of a sample liquid in an aliquoting structure provided therefor, for example a cavity array structure. In particular, the apparatus can be embodied such that the aliquoting structure can be connected to a microfluidic network in which it is possible to perform automated processing of the sample liquid, in particular of a small volume of sample liquid, using a transport liquid, for example prior to the aliquoting of the sample liquid. In addition, the apparatus can comprise a microfluidic connection of the aliquoting structure to the microfluidic network, said microfluidic connection both bringing about capillary stabilization, and stabilization which is additionally or alternatively brought about by differences in density, of phase boundary interfaces when the liquids are being transferred into the division chamber or chamber comprising the aliquoting structure, in order to obtain spatially homogeneous filling and sealing of cavities or of all the cavities, and permitting a high transfer efficiency of the sample liquid into the cavities of the aliquoting structure. The method for the operation or for the fundamental use of the apparatus can be embodied in particular in such a way that it, on the one hand, allows a small volume of the sample liquid to be aliquoted to be transported without any dead volume in a microfluidic network using a transport liquid and, on the other hand, allows the aliquoting structure to first be filled with the sample liquid and then with a sealing liquid, wherein said sealing liquid may be a liquid which is different to the transport liquid. In particular, the sample liquid and the sealing liquid can already comprise a common boundary interface during the transport to the aliquoting structure and the filling of the cavities with the sample liquid, in order to allow direct sealing of the cavities of the aliquoting structure that are filled with the sample liquid using the sealing liquid. In particular, the apparatus can additionally permit efficient control of the temperature of the sample liquid present in the cavities, spatially resolved optical detection of a fluorescence signal emitted by the sample liquid, pre-storage of reagents in the cavities of the aliquoting structure and discharging of gas bubbles that form, in particular during the temperature-control operation. In particular, here, the apparatus can be suitably aligned with respect to a gravitational field so as to, on the one hand, discharge gas bubbles that form by means of the buoyancy force that is present and to, on the other hand, bring about spatial stabilization of the two-phase boundary interface, in particular between the sample liquid and the sealing liquid, in particular during the propagation through the division chamber, by means of a density difference that is present.

Expressed differently, according to embodiments, a microfluidic apparatus and a method for automated or fully automated processing and aliquoting of a sample liquid can be provided, wherein after being processed in the apparatus, the sample liquid can be transported, in particular without losses, to an aliquoting structure with the aid of at least one further phase that is immiscible with the sample liquid, wherein a microfluidic connection of the aliquoting structure to the microfluidic network can be provided in a configuration which can bring about stabilization of the phase boundary interfaces when the liquids are being transferred into the division, or during the propagation through the division chamber, in order to achieve reliable filling and sealing of all the cavities and a high transfer efficiency, said stabilization being brought about by capillary forces, in particular in the region of a branching, chip edge, or the like, and/or by a difference in density between the liquids, for example in the case of filling from below and tilting of the apparatus, and/or by a change in the fluidic resistance, in particular as a result of a tapering of a channel downstream of the branching or as a result of a tapering of a channel at the chip edge, wherein the sample liquid and additionally or alternatively the sealing liquid can be degassed in the apparatus in order to prevent or reduce the formation of gas bubbles during thermocycling in the aliquoting structure.

BRIEF DESCRIPTION OF THE DRAWINGS

Exemplary embodiments of the approach presented here are illustrated in the drawings and discussed in more detail in the following description. In the drawings.

DETAILED DESCRIPTION

In the following description of expedient exemplary embodiments of the disclosure, the same or similar reference designations will be used for the elements of similar action illustrated in the various figures, wherein a repeated description of these elements will be omitted.

Figure 1:
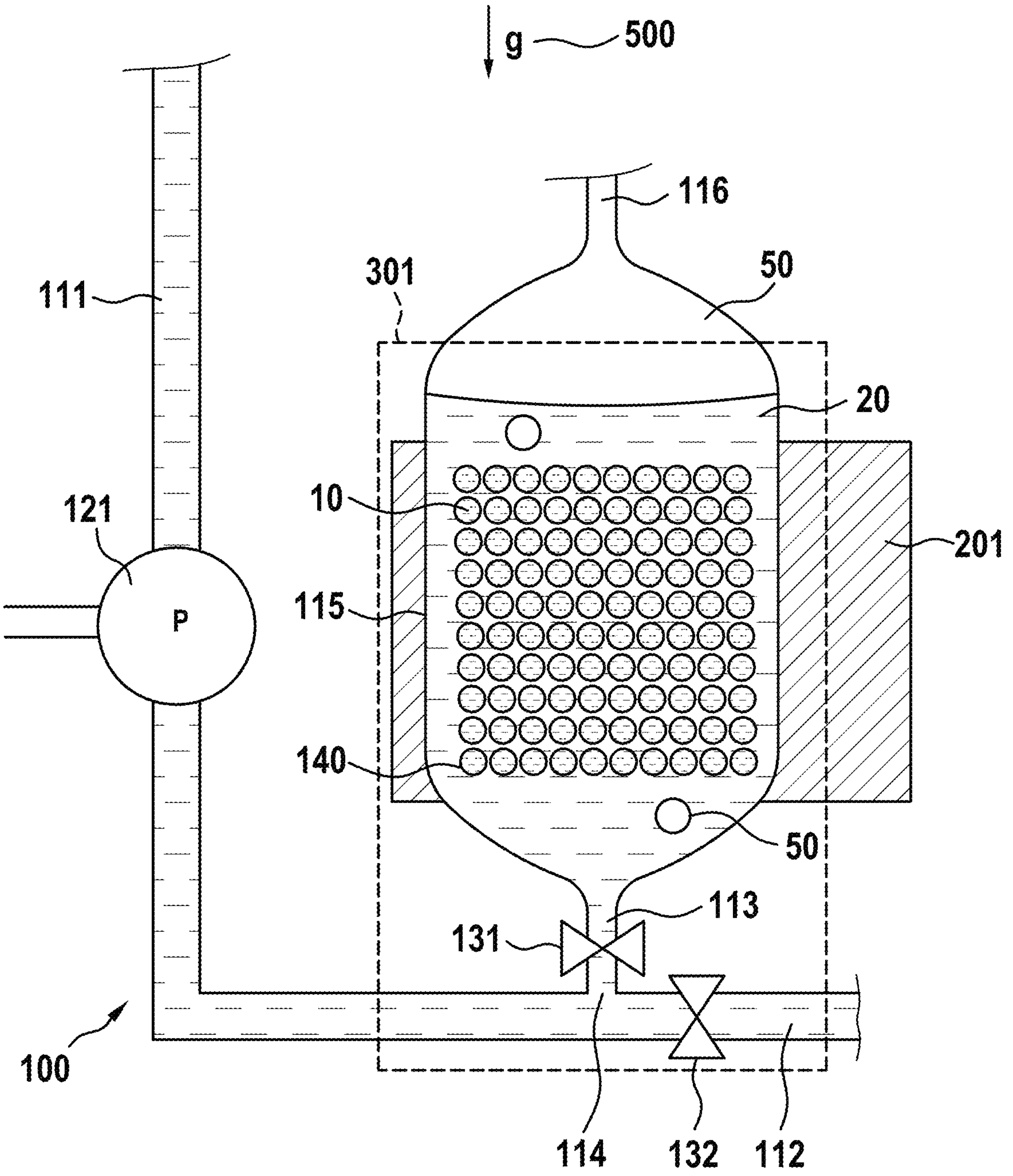
FIG. 1 shows a schematic illustration of a microfluidic apparatus according to one exemplary embodiment.

FIG. 1 shows a schematic illustration of a microfluidic apparatus 100 according to one exemplary embodiment, in particular a schematic illustration of a cross section through a microfluidic apparatus 100 according to one exemplary embodiment. A microfluidic network is connected to a central chamber or division chamber 115 via at least one feed channel 111, at least one pump device 121, and at least one channel branching point 114 of the feed channel 111 into a discharge channel 112 and a supply channel 113, and at least two valves 131, 132 or alternatively a multi-way valve for controlling the microfluidic flow at the branching point 114.

The division chamber 115 has in particular a plurality of cavities or apertures or compartments 140 which can be filled with a sample liquid 10 as first phase and can be overlaid with a sealing liquid 20 as second phase, such that the sample liquid 10 at least partially remains in the cavities 140. In this way, microfluidic aliquoting of the sample liquid 10 is achieved. Furthermore, the division chamber 115 also has a connection to a removal channel 116 in addition to a connection to the supply channel 113.

In other words, the microfluidic apparatus 100 for processing and aliquoting the sample liquid 10 thus comprises the division chamber 115 for the purpose of accommodating an input volume of the sample liquid 10. The division chamber 115 has a plurality of cavities 140 for accommodating partial volumes of the sample liquid 10 that are usable for detection reactions. Furthermore, the apparatus 100 comprises a microfluidic network for making the division chamber 115 accessible in fluid-mechanical fashion. The microfluidic network has at least one feed channel 111 having at least one channel branching point 114 into a discharge channel 112 and a supply channel 113 which is connected to the division chamber 115 in fluid-mechanical fashion, at least one valve 131, 132 for influencing a fluid flow in the region of the channel branching point 114 and a removal channel 116 which is connected to the division chamber 115 in fluid-mechanical fashion. Furthermore, the apparatus 100 comprises at least one pump device 121 for conveying fluids within the apparatus 100. The at least one pump device 121 and the microfluidic network are designed to convey the sample liquid 10 as a first phase through the microfluidic network into the division chamber 115, in order to arrange partial volumes of the sample liquid 10 in the cavities 140, and to convey a sealing liquid 20 as a second phase through the microfluidic network into the division chamber 115, in order to seal the partial volumes of the sample liquid 10 in the cavities 140 using the sealing liquid 20.

In the exemplary embodiment illustrated schematically in FIG. 1, the apparatus 100 additionally comprises at least one thermal interface or heat-exchange interface or temperature-control device 201 in the region of the division chamber 115 and in particular of the cavities 140, and also an optical interface or detection device 301 in particular in the region of the cavities 140. The temperature-control device 201 can thus be used in particular to control the temperature of the first phase or sample liquid 10 enclosed in the cavities 140. The detection device 301 can be used in particular to optically read a fluorescence signal which is emitted in particular by the sample liquid 10 enclosed in the cavities 140. Furthermore, during the processing, the apparatus 100 in the exemplary embodiment shown in FIG. 1 is suitably oriented with respect to a gravitational field g or alternatively set in rotation, such that a buoyancy force 500 results which can be used to discharge gas bubbles 50 that may form.

According to the exemplary embodiment illustrated in FIG. 1, the pump device 121 is connected in the feed channel 111 in fluid-mechanical fashion. A first valve 131 is connected in the supply channel 113 between the branching point 114 and the division chamber 115. A second valve 132 is connected in the discharge channel 112.

Figure 2A:
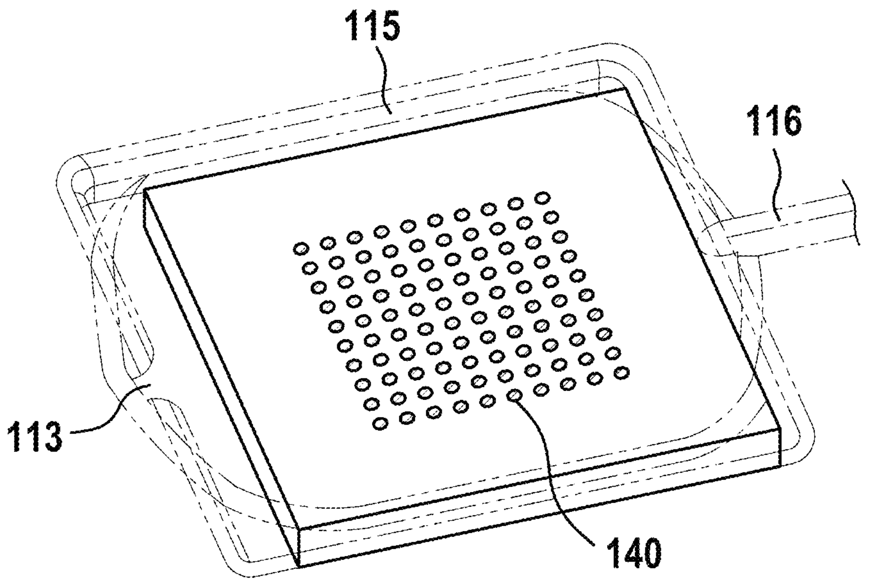
FIG. 2A shows a schematic illustration of a partial portion of a microfluidic apparatus according to one exemplary embodiment.
Figure 2B:
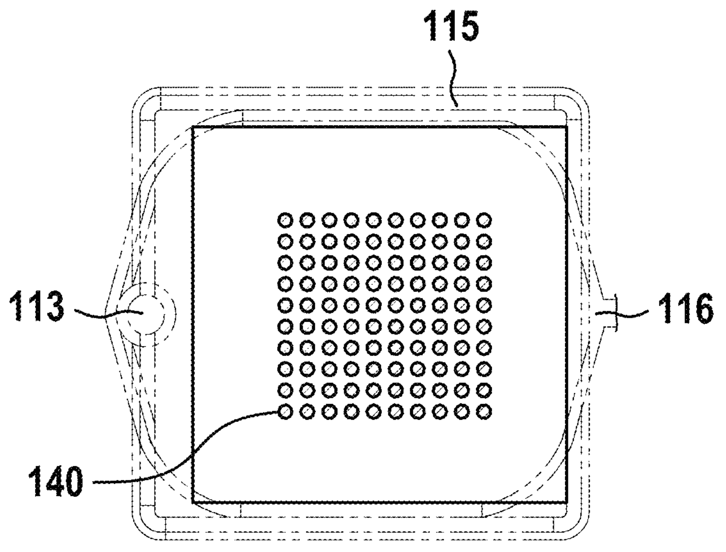
FIG. 2B shows a schematic illustration of a partial portion of a microfluidic apparatus according to one exemplary embodiment.
Figure 2C:
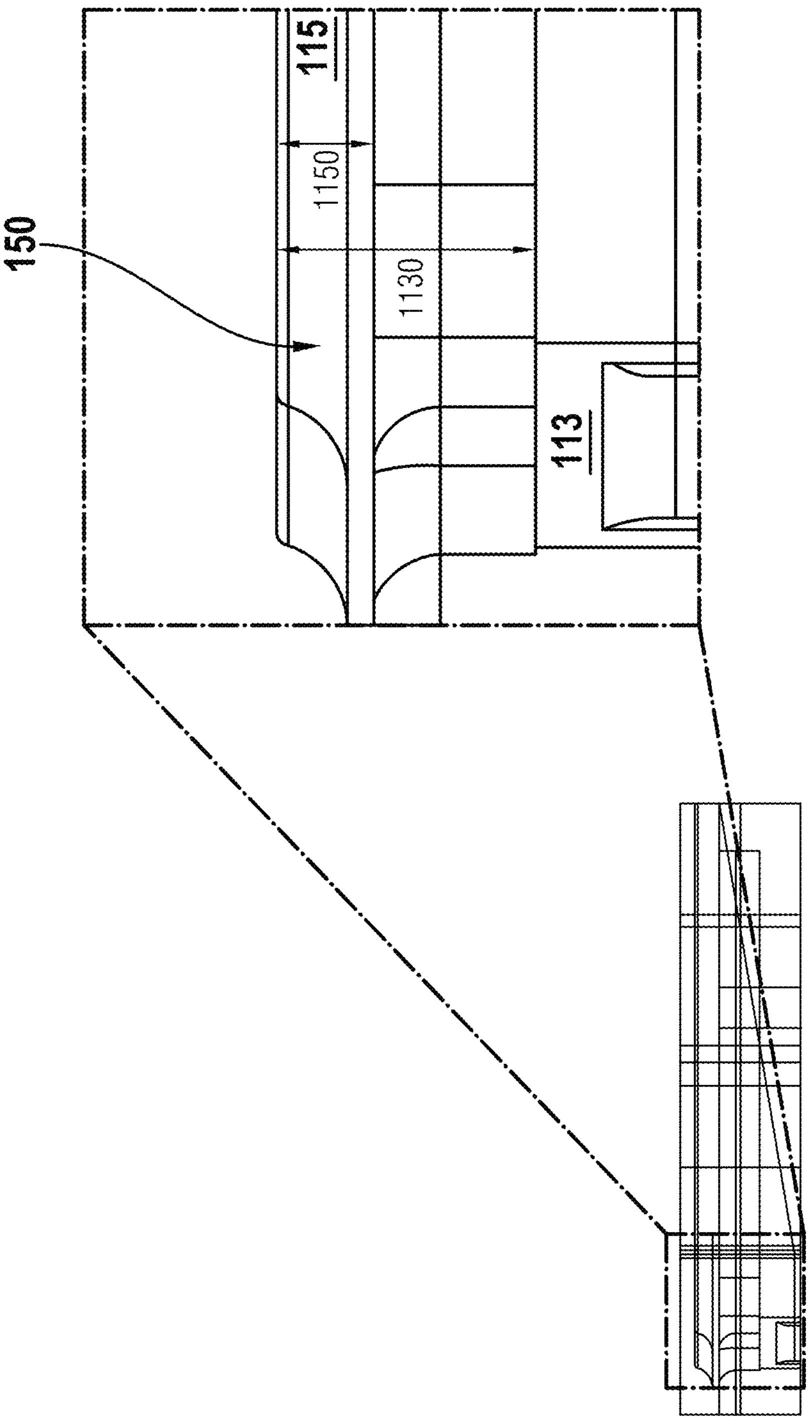
FIG. 2C shows a schematic illustration of a partial portion of a microfluidic apparatus according to one exemplary embodiment.

FIG. 2A, FIG. 2B and FIG. 2C show schematic illustrations of a partial portion of an apparatus according to one exemplary embodiment. The apparatus corresponds or is similar to the apparatus from FIG. 1. FIG. 2A shows an oblique plan view, FIG. 2B shows a plan view and FIG. 2C shows a sectional view of the partial portion of the apparatus. In this exemplary embodiment, the cavities 140 are located in a chip which is fixed in the division chamber 115, for example by means of an adhesive bond which connects a first side of the chip and a first side of the division chamber 115 to one another.

The supply channel 113 leads from the first side into the division chamber 115. The removal channel 116 is arranged on a second side of the division chamber 115. The geometry of the division chamber 115 and of the chip comprising the cavities 140 results in an abrupt reduction in the spatial dimensions 1130, 1150 of the fluid-conducting region 150 of the division chamber 115 at the transition to the chip comprising the cavities 140. This reduction in the spatial dimensions 1130, 1150 is accompanied by a change in the capillary pressure that is present in accordance with the Young-Laplace equation. So-called pinning also occurs at an edge which is present at the location of abrupt reduction in the fluid-conducting region 150. In this way, an alignment, assisted by capillary action, of a liquid meniscus along the total width of the chip can be promoted, before the liquid wets a second side of the chip comprising the cavities 140. The spatially homogeneous change in capillary pressure and fluidic resistance along the total width of the chip also assists in the formation of a homogeneous flow profile in the division chamber 115, in particular in the region of the cavities 140 which are arranged on the second side of the chip.

In addition, in this advantageous configuration of the apparatus, the use of a sealing liquid having a density higher than the density of the sample liquid, the introduction of the liquids on the first side of the central chamber 115 and a suitable alignment of the central chamber 115 and/or of the apparatus 100 with respect to a gravitational field, for example by suitable tilting of the apparatus, make it possible, on account of the present density difference, to achieve a stable separation of sample liquid and sealing liquid and a spatially uniform propagation of the two-phase boundary interface through the central chamber 115, in the case of which each of the cavities 140 is first filled with sample liquid and then overlaid with the sealing liquid.

Overall, in dependence on the selected dimensions, the apparatus thus permits the formation of a flow profile that is as spatially homogeneous as possible both as a result of the arising capillary forces and the gravitational force acting on the liquids. In this way, on the one hand, reliable filling and sealing of all the cavities 140 can be achieved and, on the other hand, a high transfer efficiency of the sample liquid from the microfluidic network into the cavities 140 of the aliquoting structure can be obtained; i.e. a relatively small volume of sample liquid is already sufficient for filling all the cavities 140.

Figure 3:
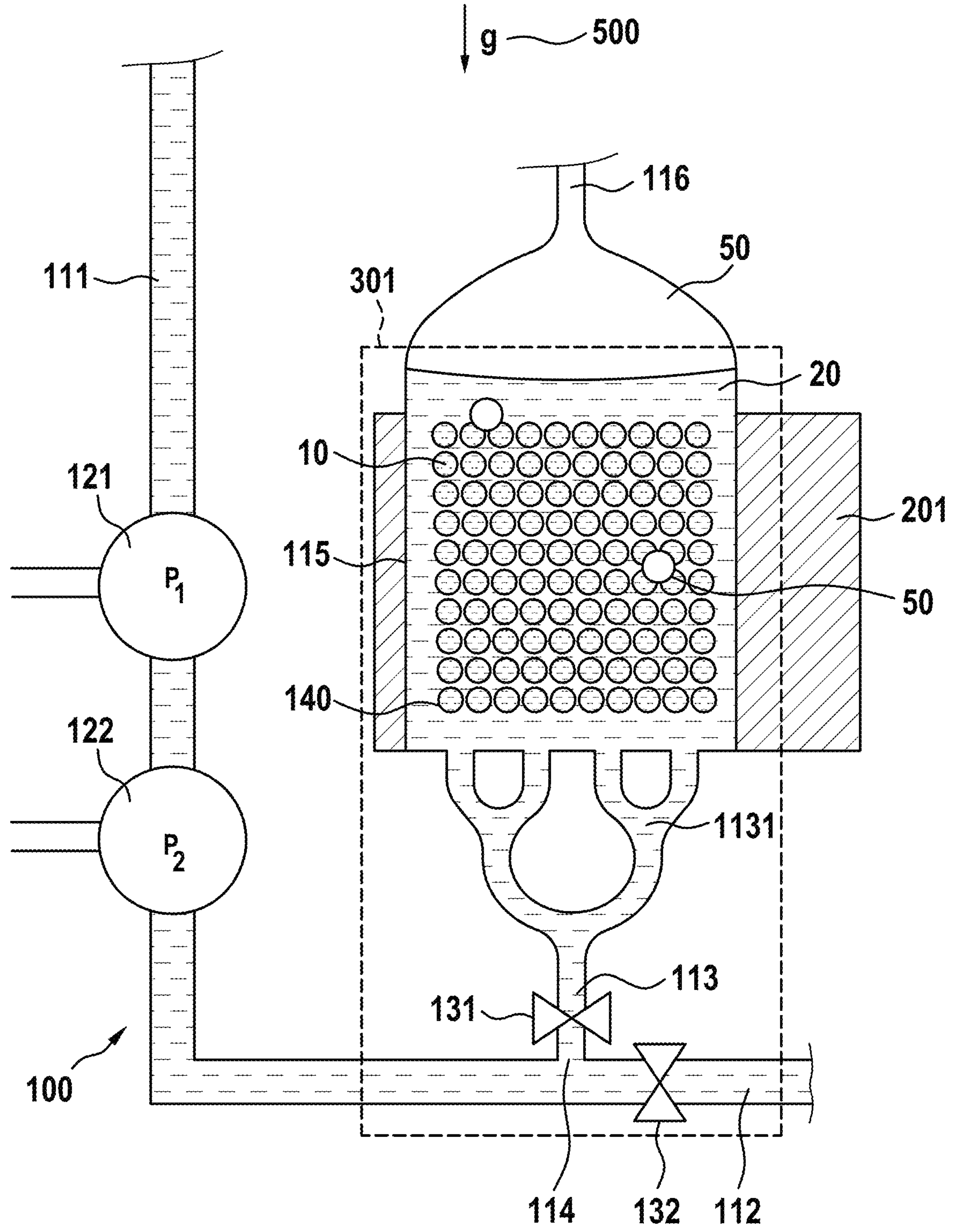
FIG. 3 shows a schematic illustration of a microfluidic apparatus according to one exemplary embodiment.

FIG. 3 shows a schematic illustration of a microfluidic apparatus 100 according to one exemplary embodiment, in particular a schematic cross section through an apparatus 100 according to a further exemplary embodiment. Here, the apparatus 100 is similar to the apparatus from one of the figures outlined above, in particular FIG. 1. In this exemplary embodiment, the apparatus 100 comprises two pump devices 121, 122, such as for example peristaltic pumps, which are suitable for effecting different flow rates in the microfluidic network of the apparatus 100. The combination of two pump devices 121, 122 having different pump volumes makes it possible to achieve both particularly rapid and particularly precise pumping of liquids. Furthermore, in the exemplary embodiment illustrated in FIG. 3, the supply channel 131 to the central chamber 115 has a branching arrangement 1131 which is used for the production of a spatially homogeneous flow in the central chamber 115 and for the capillary stabilization of the microfluidic boundary interfaces during the widening of the flow.

Here, a second pump device 122 is connected in the feed channel 111 between a first pump device 121 and the branching point 114. At the branching arrangement 1131, the supply channel 113 branches into a plurality of sub-channels, here four sub-channels merely by way of example.

Figure 4:
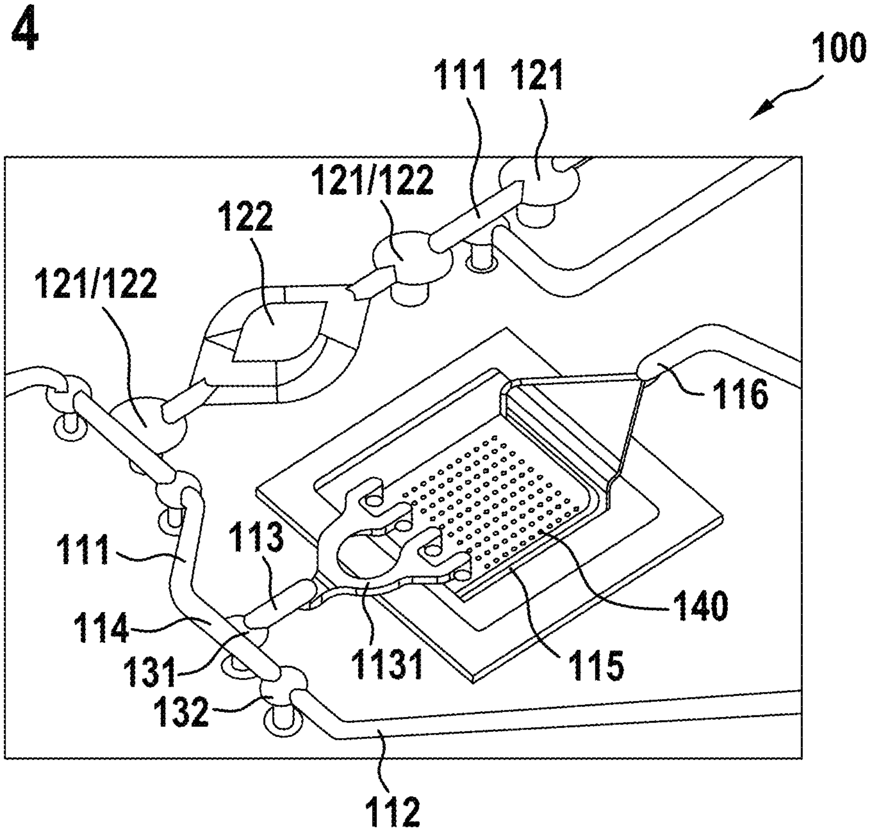
FIG. 4 shows a schematic illustration of a microfluidic apparatus according to one exemplary embodiment.

FIG. 4 shows a schematic illustration of an apparatus 100 according to one exemplary embodiment. Here, the apparatus 100 is similar to the apparatus from one of the figures outlined above. In this exemplary embodiment of the apparatus 100, production and control of a microfluidic flow is based on the use of an elastic membrane which can be deflected by targeted application of pressure at defined points. The membrane is deflected into apertures of the microfluidic network that are provided therefor in order to, as a result, for example displace liquids, e.g. in the form of a pump chamber, or to open or close a fluidic path, e.g. in the form of at least one valve. In the exemplary embodiment of the apparatus 100 illustrated in FIG. 4, three microfluidic valves are arranged on the supply channel 111, which form a peristaltic pump unit 121. The combination of two of the aforementioned three valves of the supply channel 111 with the pump chamber adjoining the two valves has the effect of realizing a second pump function 122. In dependence on the pump function used, it is possible to transfer different volumes in a pump cycle. On the left below the central chamber 115 in the perspective projection depicted in FIG. 4, the supply channel 111 has a branching point 114 into a connecting channel 113 to the central chamber 115 and a discharge channel 112. The connecting channel 113 has a two-stage branching arrangement 1131 prior to the introduction into the central chamber 115 comprising the cavities 140. The central chamber 115 also has a removal channel 116.

Figure 5A:
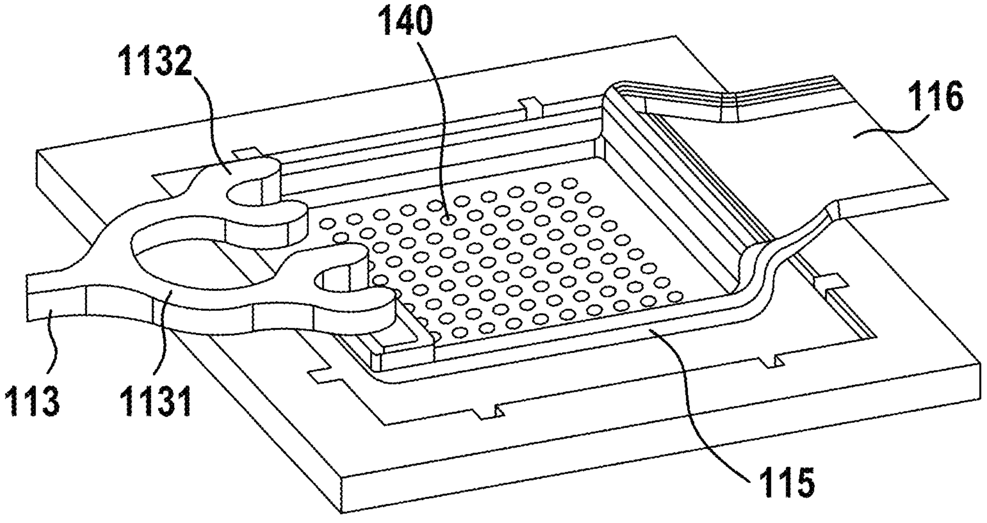
FIG. 5A shows a schematic illustration of a partial portion of a microfluidic apparatus according to one exemplary embodiment.
Figure 5B:
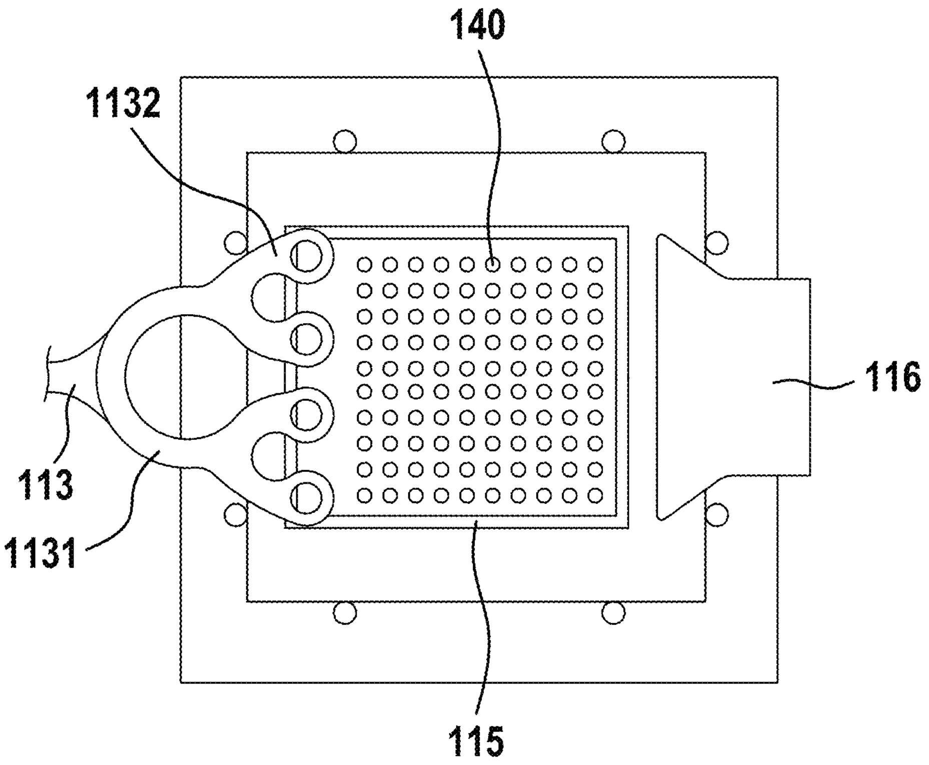
FIG. 5B shows a schematic illustration of a partial portion of a microfluidic apparatus according to one exemplary embodiment.
Figure 5C:
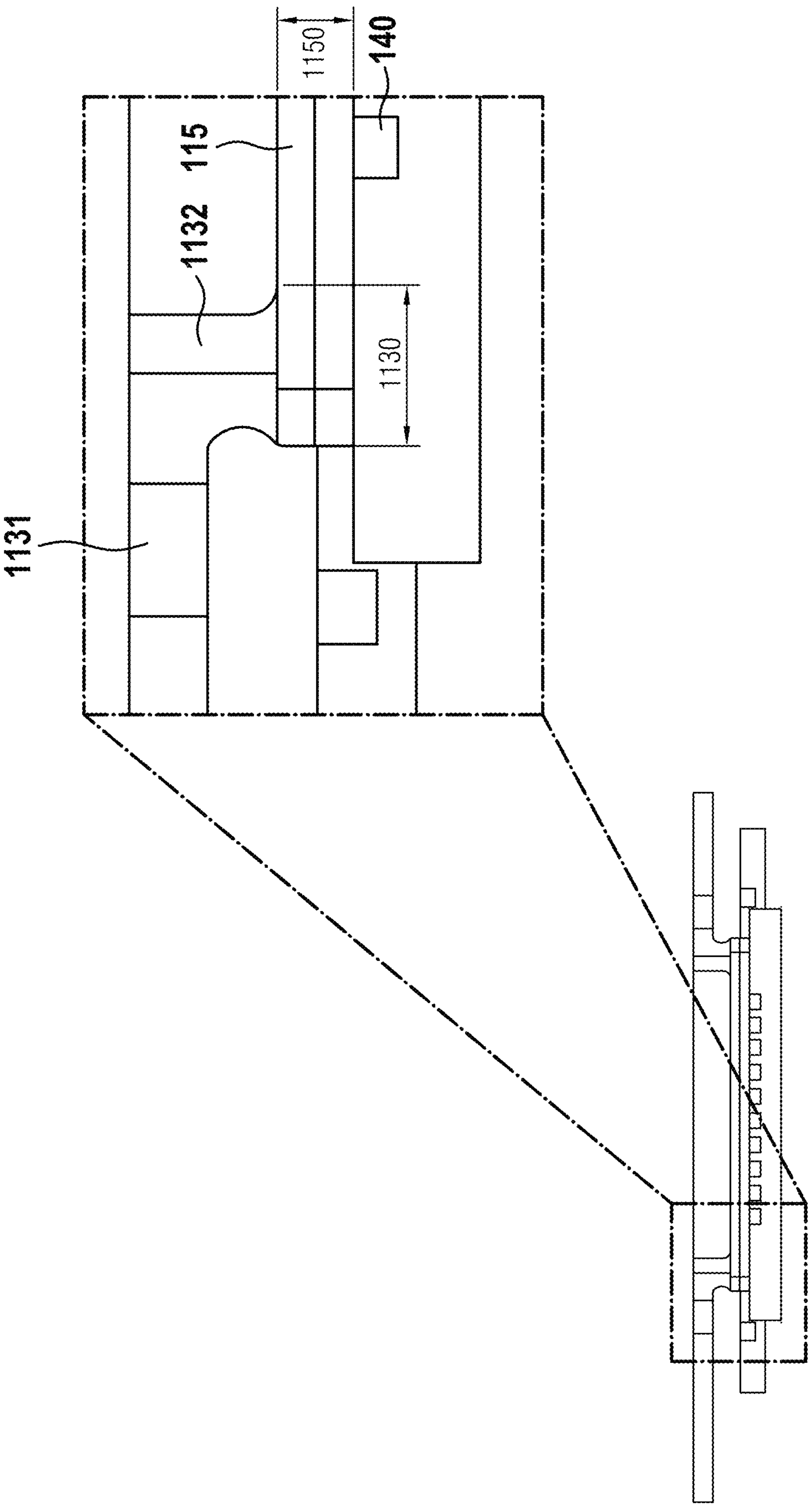
FIG. 5C shows a schematic illustration of a partial portion of a microfluidic apparatus according to one exemplary embodiment.

FIG. 5A, FIG. 5B and FIG. 5C show schematic illustrations of a partial portion of a microfluidic apparatus according to one exemplary embodiment. Here, the apparatus corresponds or is similar to the apparatus from FIG. 4. FIG. 5A shows an oblique plan view, FIG. 5B shows a plan view and FIG. 5C shows a sectional view of the partial portion of the apparatus.

More precisely, this is an implementation of the division chamber 115 comprising an aliquoting structure composed of cavities 140, said division chamber being connected to a microfluidic network via a supply channel 113 having a branching arrangement 1131 and a removal channel 116. In this advantageous embodiment of the apparatus according to the disclosure, there is a reduction in the spatial dimensions 1130, 1150 of the fluid-conducting structures at the transition of the, here for example, four channels 1132 of the branching arrangement 1131 to the division chamber 115. In particular, a height 1150 of the division chamber 115 is significantly smaller than an extent 1130 of the supply channels 1132 of the branching arrangement 1131 at the transition to the division chamber 115. In accordance with the Young-Laplace equation, this corresponds with a change in the capillary pressure that is present at the transition of the supply channels 1132 to the division chamber 115, such that the "pinning" of phase boundary interfaces that occurs here has the effect that the channels 1132 of the branching arrangement 1131 can first be completely filled and then the division chamber 115 can be filled as homogeneously as possible.

Figure 6:
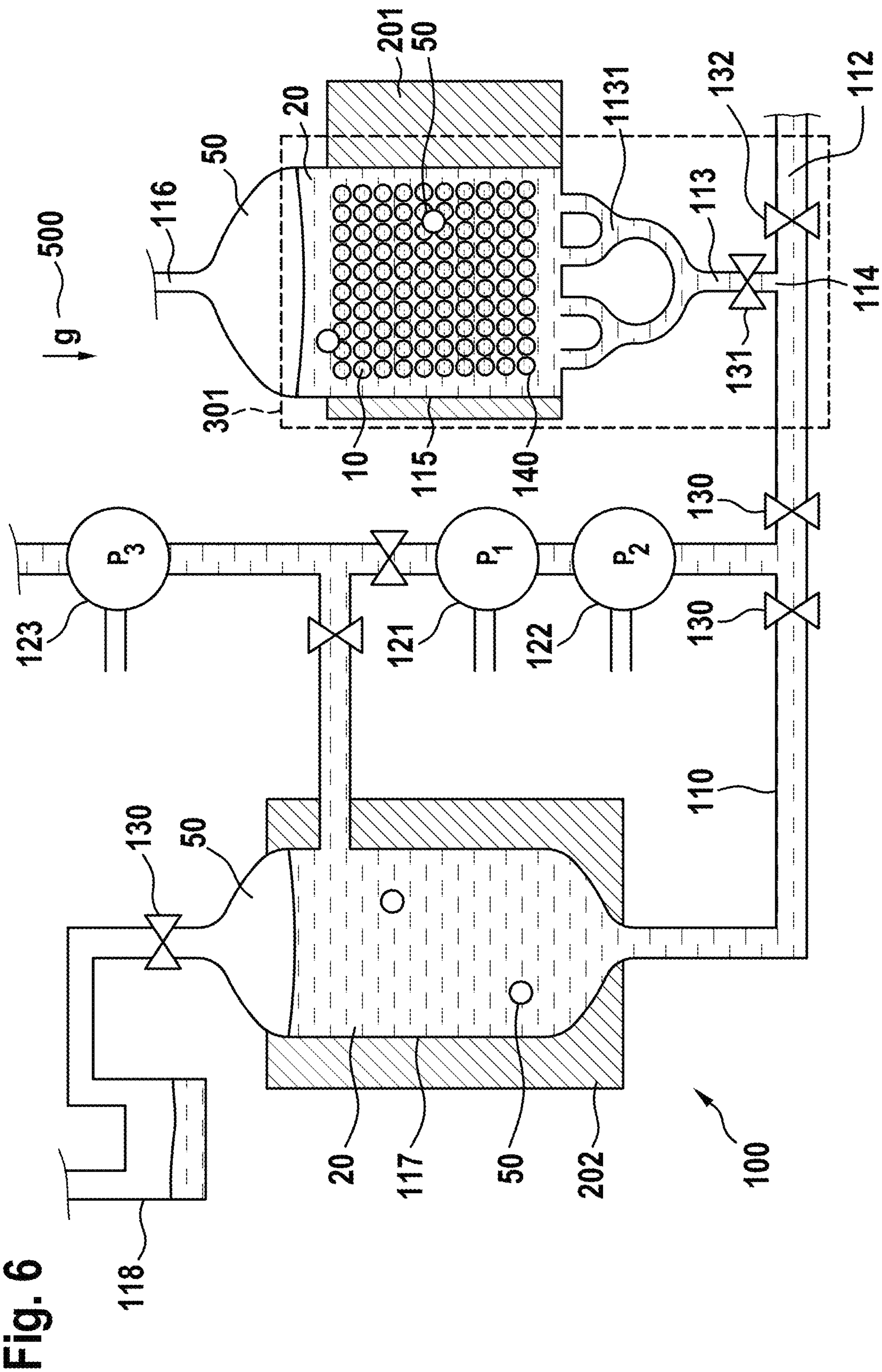
FIG. 6 shows a schematic illustration of a microfluidic apparatus according to one exemplary embodiment.

FIG. 6 shows a schematic illustration of a microfluidic apparatus 100 according to one exemplary embodiment, in particular a schematic cross section through an apparatus 100 according to a further exemplary embodiment. Here, the apparatus 100 is similar to the apparatus from FIG. 3. Differences between the apparatus from FIG. 3 and the apparatus 100 illustrated in FIG. 6 are discussed below.

According to the exemplary embodiment illustrated here, the apparatus 100 comprises a further chamber 117 which is connected to the microfluidic network and which has a ventilation channel 118. Furthermore, the apparatus 100 comprises a further temperature-control device or thermal interface or heat-exchange interface 202 in the region of the further chamber 117. As a result, the further chamber 117 can be used in particular to control the temperature of liquids 10, 20, 30, for example for thermal degassing. The ventilation channel 118 makes it possible in particular to discharge gas bubbles 50 that form. The microfluidic channels 110, 111, 112, 113, 116, the pump devices 121, 122, 123 and the valves 130, 131, 132 can in this case be used to produce and control the microfluidic flow in a suitable manner, in particular between the division chamber 115, the further chamber 117 and the microfluidic network within the apparatus 100.

The first pump device 121 is connected in the feed channel 111 in fluid-mechanical fashion between the second pump device 122 and a third pump device 123. Here, the second pump device 122 is arranged between the first pump device 121 and the branching point 114. The ventilation channel 118 can be ventilated or shut off by means of a valve 130. The further chamber 117 is connected via a further channel 110 to the feed channel 111 between the second pump device 122 and the branching point 114 and is connected via a channel to the feed channel 111 between the first pump device 121 and the third pump device 123. In each case, a valve is arranged between the third pump device 123 and the first pump device 121, between the third pump device 123 and the further chamber 117, between the further chamber 117 and the second pump device 122, and between the second pump device 122 and the branching point 114.

Figure 7:
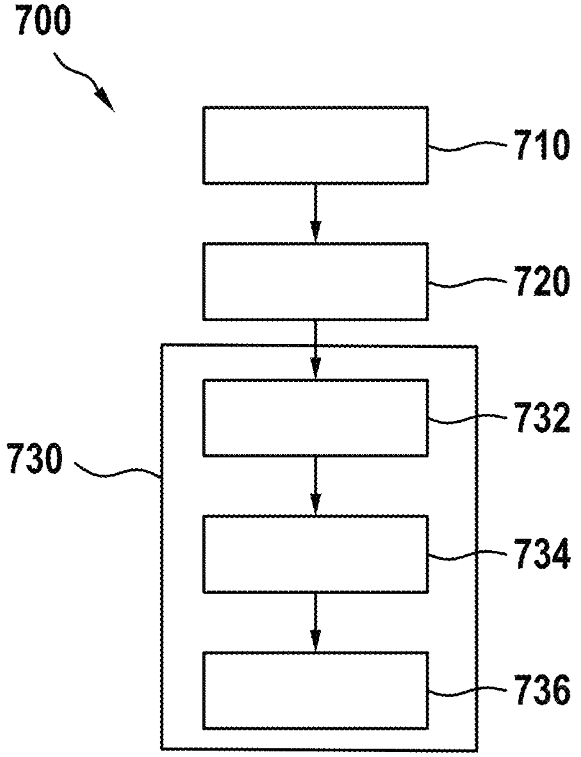
FIG. 7 shows a flow diagram of an operating method according to one exemplary embodiment.

FIG. 7 shows a flow diagram of an operating method 700 according to one exemplary embodiment. The operating method 700 can be carried out so as to operate the microfluidic apparatus from one of the figures described above or a similar microfluidic apparatus or to control an operation of same.

The operating method 700 has a step 710 of introducing the sample liquid or a sample into the apparatus. The operating method 700 then involves an effecting step 730 in which conveyance of the sample liquid as first phase, and the sealing liquid as second phase, through the microfluidic network into the division chamber is effected in order to arrange partial volumes of the sample liquid in the cavities and to seal them therein using the sealing liquid. According to the exemplary embodiment illustrated here, the step 730 of effecting conveyance has a production sub-step 732, a transporting sub-step 734 and an introduction sub-step 736, as discussed below.

In the production sub-step 732, a multi-phase system is produced from the sample liquid as first phase and from at least one further phase, which comprises the sealing liquid and/or a transport liquid, in the microfluidic network. The multi-phase system can for example be realized by embedding the sample liquid or first phase into a second phase which is immiscible or only slightly miscible with the sample liquid and which serves both as sealing liquid and as transport liquid. Alternatively, the sample liquid and the sealing liquid may be embedded on one or both sides into a further, third phase which serves as transport liquid. According to one exemplary embodiment, the liquids used, with the exception of components of the sample liquid, are in particular already pre-stored in the apparatus prior to the introduction step 710.

In the transporting sub-step 734, the multi-phase system is transported via the feed channel to the channel branching point by means of the at least one pump device. Here, the at least one valve is controlled such that a transport liquid which is optionally present in the multi-phase system is discharged via the discharge channel. In other words, in this case the multi-phase system is microfluidically transported via the supply channel to the channel branching point by means of at least one pump device, wherein a first valve is closed and the transport liquid is discharged via the discharge channel and an open second valve.

In the introduction sub-step 736, the sample liquid, followed by the sealing liquid, is introduced via the supply channel into the division chamber. Here, the at least one valve is switched over after a boundary interface between the sample liquid and the optionally present transport liquid has passed the channel branching point. In this case, in particular after the boundary interface between sample liquid and transport liquid, which may be identical to the sealing liquid, that is to say which is realized by a liquid having the same physicochemical properties, has passed the channel branching point, the second valve is closed and the first valve opened, with the result that the sample liquid, followed by the sealing liquid, is introduced via the supply channel into the division chamber. In this way, the cavities or compartments of the aliquoting structure are first filled with the sample liquid and then overlaid with the sealing liquid, such that the sample liquid is finally aliquoted in the cavities or compartments.

According to one exemplary embodiment, the method 700 also has a step 720 of putting the apparatus into a processing unit which is used, inter alia, to control the microfluidic flow within the apparatus. In order to control the microfluidic flow in the apparatus, it is for example possible to produce a pneumatic connection between the apparatus and the processing unit, said pneumatic connection allowing controlled application of pressures to the apparatus. Additionally or alternatively, it is possible to produce a mechanical connection between the apparatus and the processing unit, said mechanical connection making it possible to transmit mechanical forces onto the apparatus, for example for the purpose of releasing liquid reagents pre-stored in the apparatus, and/or making it possible to set the apparatus into controlled rotation, with the result that the liquids enclosed in the apparatus can be processed by means of the inertia forces or pseudo forces, such as centrifugal, Coriolis or Euler forces, resulting from the rotational movement of the apparatus. Additionally or alternatively, the processing unit may have further interfaces to the microfluidic apparatus, which are established in particular in the putting-in step 720, in order to for example at least locally control the temperature of the apparatus and/or detect an optical signal and/or introduce ultrasound and/or introduce mechanical energy and/or couple-in electromagnetic energy.

According to one exemplary embodiment, after the effecting step 730, the method 700 for operating the microfluidic apparatus also has a step of controlling the temperature, in particular cyclically controlling the temperature, of the division chamber, which contains the cavities or compartments of the aliquoting structure, by means of the temperature-control device or thermal interface or heat-exchange interface. In this way, thermally influenced chemical reactions, for example polymerase chain reactions, can be carried out in the aliquots of the sample liquid which are present in the individual cavities or compartments of the aliquoting structure.

According to one exemplary embodiment, in a detecting step, a detection device, in particular an optical interface, is additionally used to detect a fluorescence signal which is emitted in particular by the sample liquid in the cavities. It is thus for example possible for the presence of specific deoxyribonucleic acid sequences in the sample liquid to be indicated by using a fluorescent oligonucleotide probe (e.g. TaqMan probe) which is quenched by means of Förster resonance energy transfer (FRET) and which can be cleaved by a polymerase. As result of the use of such fluorescent probes, the course of polymerase reactions in the aliquots of the sample liquid can thus be quantitively monitored in real time. In particular, in this case suitable orientation of the apparatus makes it possible to discharge gas bubbles that form during the temperature-control operation by means of the acting buoyancy force.

According to one exemplary embodiment, the operating method 700 also has a step of degassing one or more of the liquids, in particular the sealing liquid, for example thermal degassing within the apparatus in a further chamber which has a second temperature-control device or thermal interface. In this way, the quantity of gas bubbles that form during the temperature-control operation in the central chamber can be reduced. In particular, degassing and/or heating of the multi-phase system, in particular of the sample liquid and of the sealing liquid, within the further chamber provided therefor is carried out prior to the transporting sub-step 134, that is to say before the sample liquid and the sealing liquid are successively transported into the division chamber. Optionally, only the sealing liquid is heated and thermally degassed in the further chamber. After the sealing liquid has been degassed in the further chamber, it is pumped, in particular after the introduction sub-step 736 and prior to the temperature-control step, into the division chamber such that the quantity of sealing liquid present in the division chamber is replaced by the quantity of sealing liquid that has previously been heated and thermally degassed in the further chamber. In this way, the quantity of gas bubbles that form in particular during the thermal processing in the temperature-control step in the division chamber can be reduced.

Exemplary dimensions and specifications of the apparatus 100 are outlined briefly below with reference to the figures described above.

Lateral dimensions of the apparatus 100 are for example 30×30 $mm^2$ to 300×300 $mm^2$, preferably 50×50 $mm^2$ to 100×100 $mm^2$. Polymer substrates have a thickness for example of 0.6 mm to 30 mm, preferably 1 mm to 10 mm. A polymer membrane has a thickness for example of 50 μm to 500 μm, preferably 100 μm to 300 μm. Cross sections of the microfluidic channels 111, 112, 113 are for example 100×100 $\mu m^2$ to 3×3 $mm^2$, preferably 300×300 $\mu m^2$ to 1×1 $mm^2$. The pump chambers of the pump devices 121, 122, 123 have a volume for example of 30 nl to 100 μl, preferably 100 nl to 30 μl. Dimensions of the division chamber 115 comprising the aliquoting structure are for example 3×3×0.1 $mm^3$ to 30×30×3 $mm^3$, preferably 3×3×0.3 $mm^3$ to 10×10×1 $mm^3$. The division chamber 115 comprising the aliquoting structure has a volume for example of ~1 μl to ~3 ml, preferably ~3 μl to ~100 μl. The cavities or compartments 140 of the aliquoting structure have a volume for example of 10 pl to 10 μl, preferably 10 nl to 300 nl. Lateral dimensions of the temperature-control device or thermal interface 201, 202 are for example 1×1 $mm^2$ to 100×100 $mm^2$, preferably 3×3 $mm^2$ to 30×30 $mm^2$.

The sample liquid or first phase 10 comprises, for example, aqueous solutions, in particular for carrying out chemical, biochemical, medical or molecular diagnostic analyses, in particular with sample material, in particular of human origin, e.g. obtained from bodily fluids, smears, secretions, sputum or tissue samples, contained therein. Targets to be detected in the sample liquid have in particular medical, clinical, therapeutic or diagnostic relevance and can for example be bacteria, viruses, specific cells, such as for example circulating tumor cells, cell-free DNA, proteins or other biomarkers.

The sealing liquid or second phase 20 and the transport liquid or third phase 30 comprise, in particular, mineral oils, silicone oils, fluorinated hydrocarbons, such as for example 3M Fluorinert or Fomblin in suitable combination, wherein the two phases are immiscible or only slightly miscible with one another (for example 3M Fluorinert FC-40 or FC-70 and silicone oil), in particular having a low water solubility in order to prevent undesired mixing with the sample liquid or first phase 10, and/or having a low viscosity in order to obtain a high mobility, i.e. satisfactory discharging of gas bubbles 50 that form, and/or having a low thermal conductivity in order to keep the occurring parasitic heat losses as low as possible, and/or having a low thermal capacity in order to keep the thermal mass to be processed as small as possible, and/or containing surfactants in order to stabilize the boundary interface to the sample liquid or first phase 10.

The apparatus 100 is in particular primarily manufactured from polymers such as for example polycarbonate (PC), polypropylene (PP), polyethylene (PE), cycloolefin copolymer (COP, COC), polymethyl methacrylate (PMMA), polydimethylsiloxane (PDMS) or thermoplastic elastomers (TPE) such as polyurethane (TPU) or styrene block copolymer (TPS), in particular by high-throughput methods such as injection molding, thermoforming, punching, laser transmission welding. Where appropriate, the apparatus 100, in particular in the region of the heat-exchange interface or thermal interface or temperature-control device 201, is provided with components of materials having a high thermal conductivity, such as for example metals such as aluminum, copper, silver or alloys or silicon, in order to obtain an improved exchange of heat between liquids 10, 20, 30 enclosed in the apparatus 100 and the heating and/or cooling apparatuses used.

The microfluidic pump devices 121, 122, 123 and valves 130, 131, 132 are realized for example by the pneumatically actuated deflection of a polymer membrane into apertures in at least one polymer substrate, in which microfluidic channels and chambers are arranged.

If an exemplary embodiment comprises an "and/or" combination between a first feature and a second feature, this is to be read as meaning that the exemplary embodiment has, in one embodiment, both the first feature and the second feature and, in a further embodiment, either only the first feature or only the second feature.

The invention claimed is:

1. A microfluidic apparatus for processing and aliquoting a sample liquid, the microfluidic apparatus comprising:

a division chamber configured to accommodate an input volume of the sample liquid, the division chamber defining a plurality of cavities configured to accommodate partial volumes of the sample liquid that are usable for detection reactions, the plurality of cavities representing an aliquoting structure;

a microfluidic network configured to make the division chamber fluidly accessible, the microfluidic network defining at least one feed channel, a removal channel fluidly connected to the division chamber, at least one channel branching point at which the at least one feed channel branches into a discharge channel and a supply channel that is fluidly connected to the division chamber, and at least one valve configured to influence fluid flow in a region of the at least one channel branching point; and at least one pump device configured to convey fluids within the microfluidic apparatus, wherein the at least one pump device and the microfluidic network are configured to convey the sample liquid as a first phase through the microfluidic network into the division chamber, in order to arrange the partial volumes of the sample liquid in the cavities of the plurality of cavities, and to convey a sealing liquid as a second phase through the microfluidic network into the division chamber, in order to seal the partial volumes of the sample liquid in the cavities of the plurality of cavities using the sealing liquid, wherein the microfluidic apparatus includes a fluid-conducting region upstream of the aliquoting structure, the fluid-conducting region having a reduction in spatial dimensions at a transition from the microfluidic network to the division chamber, and wherein the microfluidic apparatus is configured such that the sample liquid and the sealing liquid are stored outside the division chamber and the sample liquid and the sealing liquid have a common boundary interface during transport to the aliquoting structure and during filling of the plurality of cavities with the sample liquid.

2. The microfluidic apparatus as claimed in claim 1, further comprising:

the sample liquid; and the sealing liquid.

3. The microfluidic apparatus as claimed in claim 1, further comprising:

a temperature-control device configured to control a temperature of the partial volumes of the sample liquid that are arranged in the cavities; and/or a detection device configured to optically detect at least one property of the partial volumes of the sample liquid that are arranged in the cavities.

4. The microfluidic apparatus as claimed in claim 1, wherein:

the supply channel is branched into at least two subchannels which lead into the division chamber, and at least one dimension of a fluid channel cross section is reduced at a region in which the at least two subchannels lead into the division chamber.

5. The microfluidic apparatus as claimed in claim 1, wherein:

the cavities of the plurality of cavities are formed in a chip which is arranged in the division chamber, and at least one dimension of a fluid-conducting region of the division chamber is reduced in a transition region to the chip in the division chamber.

6. The microfluidic apparatus as claimed in claim 1, further comprising:

at least one elastic membrane configured to be (i) deflected into at least one pump chamber in order to perform a function of the at least one pump device, and/or (ii) deflected into at least one valve chamber in order to perform a function of the at least one valve.

7. The microfluidic apparatus as claimed in claim 1, wherein:

the at least one pump device includes a plurality of the pump devices, and the pump devices are configured to convey the fluid in the microfluidic network at different flow rates and/or to convey different fluid volumes per pump cycle.

8. The microfluidic apparatus as claimed in claim 1, further comprising:

a temperature-control device configured to control a temperature of the partial volumes of the sample liquid that are arranged in the cavities;

a further chamber fluidly connected in parallel to the at least one feed channel and fluidly connected to a ventilation channel; and a further temperature-control device configured to control a temperature of fluid arranged in the further chamber.

9. A method for operating a microfluidic apparatus, comprising:

introducing a sample liquid into the microfluidic apparatus;

conveying the sample liquid as first phase through a microfluidic network into a division chamber in order to arrange partial volumes of the sample liquid in cavities of a plurality of cavities of the division chamber, the plurality of cavities representing an aliquoting structure, the microfluidic network including at least one feed channel, a removal channel fluidly connected to the division chamber, at least one channel branching point at which the at least one feed channel branches into a discharge channel and a supply channel that is fluidly connected to the division chamber, and at least one valve configured to influence fluid flow in a region of the at least one channel branching point; and conveying a sealing liquid as a second phase through the microfluidic network into the division chamber in order to seal the partial volumes of the sample liquid in the cavities using the sealing liquid, wherein the microfluidic apparatus includes a fluid-conducting region upstream of the aliquoting structure, the fluid-conducting region having a reduction in spatial dimensions at a transition from the microfluidic network to the division chamber, and wherein the sample liquid and the sealing liquid are stored outside the division chamber, and the conveying of the sample liquid and the conveying of the sealing liquid include transporting the sample liquid and the sealing liquid with a common boundary interface to the aliquoting structure and during filling of the plurality of cavities with the sample liquid.

10. The method as claimed in claim 9, wherein effecting the conveyance of the sample liquid and effecting the conveyance of the sealing liquid comprises:

producing a multi-phase system from the sample liquid as first phase and from at least one further phase, which comprises the sealing liquid and a transport liquid, in the microfluidic network;

transporting the multi-phase system via the at least one feed channel to the at least one channel branching point using at least one pump device, wherein the at least one valve is controlled such that the transport liquid is discharged via a discharge channel; and introducing the sample liquid, followed by the sealing liquid, via the supply channel into the division chamber by switching over the at least one valve after the boundary interface between the sample liquid and the transport liquid has passed the at least one channel branching point.

11. The method as claimed in claim 9, further comprising:

controlling a temperature of the partial volumes of the sample liquid that are arranged in the cavities.

12. The method as claimed in claim 9, further comprising:

optically detecting at least one property of the partial volumes of the sample liquid that are arranged in the cavities.

13. The method as claimed in claim 9, further comprising:

thermally degassing the sample liquid and/or the sealing liquid in a further chamber which is fluidly connected in parallel to the at least one feed channel and is fluidly connected to a ventilation channel.

14. The method as claimed in claim 13, further comprising:

displacing the sealing liquid which seals the partial volumes of the sample liquid that are arranged in the cavities by the sealing liquid that has been thermally degassed.

* * * * *